United States Patent Office 2,931,671
Patented Apr. 5, 1960

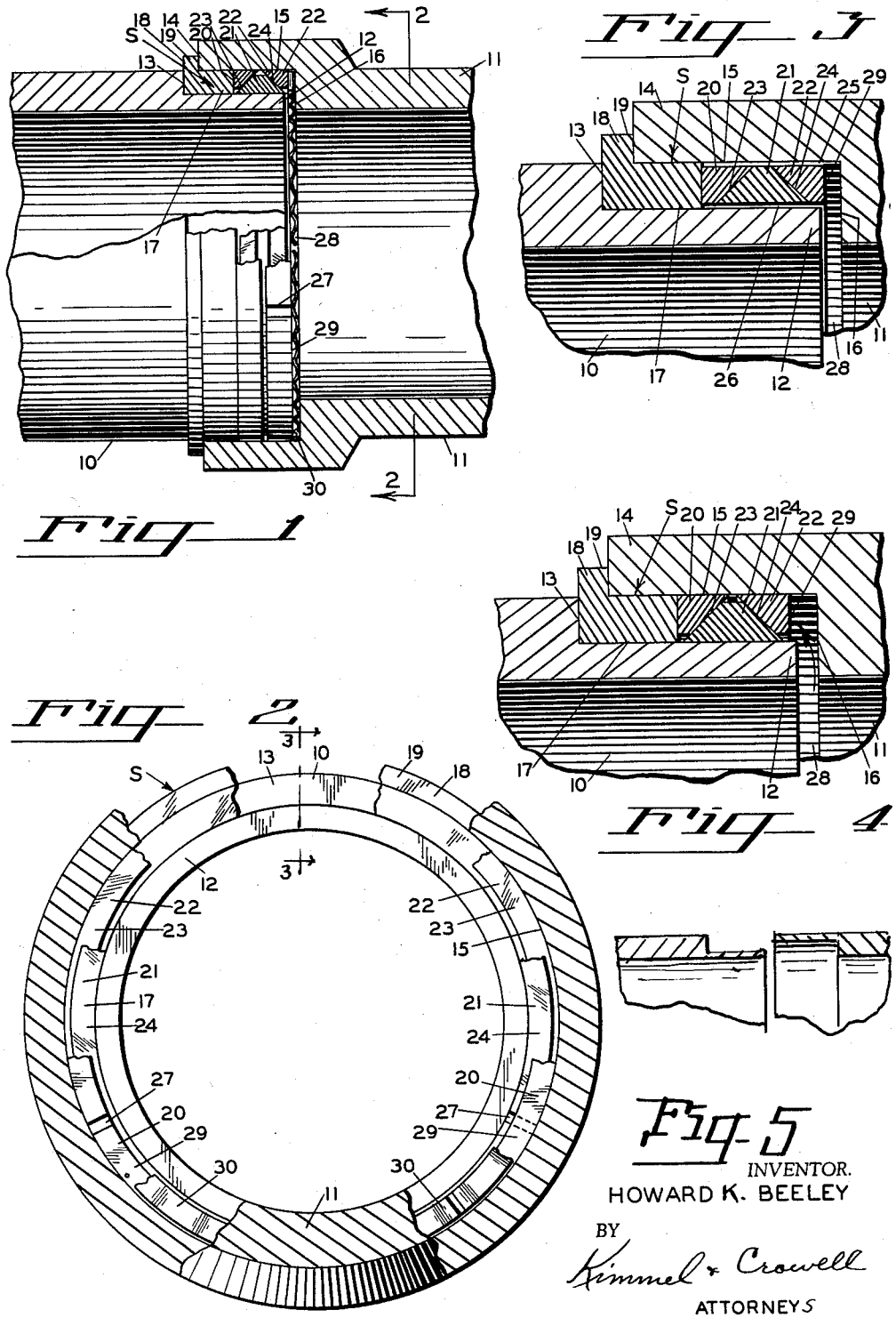

2,931,671

SEALS FOR GAS CARRYING PIPE LINES

Howard K. Beeley, Eugene, Oreg.

Application March 25, 1957, Serial No. 648,327

2 Claims. (Cl. 285—95)

The present invention relates to joint seals for fluid pipes, gas pipes and the like, and is especially effective when used in connection with exhaust pipes of internal combustion engines.

In gas lines, especially hot lines such as are encountered in exhaust pipes, contraction and expansion due to heating and cooling loosens the conventional seal between two pipes joined together and permits leaking therefrom.

The primary object of the invention is to provide a seal between pipe ends that will remain gas tight under expansion and contraction action caused by heat fluctuations in the pipe line.

A further object of this invention is to provide a gas tight seal that will remain gas tight under vibration caused by movement of the joint.

In the carrying out of the above objects, the pressure of the gas within the pipe line is utilized to maintain the seal in a gas tight condition. The greater the gas pressure, the tighter the seal existing in the joint where the pipes come together.

Other objects and advantages will become apparent in the following specification when considered in the light of the attached drawings, in which:

Figure 1 is a partial sectional side view of the invention, with parts broken away for convenience of illustration.

Figure 2 is an enlarged transverse sectional view, taken on the line 2—2 of Figure 1, looking in the direction of the arrows, parts broken away for convenience of illustration.

Figure 3 is an enlarged sectional view of the seal before gas pressure is applied from within the pipe line, taken on the line 3—3 of Figure 2, looking in the direction indicated.

Figure 4 is a view similar to Figure 3, with gas pressure within the pipe line.

Figure 5 is a fragmentary cross-section of a straight pipe prepared for receiving the seal joint.

Referring now to the drawings in detail wherein like reference numerals indicate like parts throughout the several figures, the reference character S indicates a seal constructed in accordance with the invention.

The ends of two pipes 10 and 11 are illustrated joined together and sealed by this new and improved seal S. The end 12 of the pipe 10 has its outside diameter reduced, providing a shoulder 13 spaced from the end 12 of the pipe 10. The end 14 of the pipe 11 is cored out at 15, providing an inner shoulder 16 spaced from its end 14. The pipes 10 and 11 provide an annular space 17 between the ends 12 and 14 when the pipes 10 and 11 are joined.

The seal S consists of an annular ring 18 which surrounds the reduced end 12 of the pipe 10 with a minimum clearance sufficient only to permit the placement of the ring 18 over the end 12. The outer periphery of the ring 18 engages within the cored out end 15 of the pipe 11 with just enough clearance to insert the ring 18 within the end 14 of the pipe 11.

The ring 18 has a radial flange 19 forming part thereof, which spaces the ends 12 and 14 of the pipes 10 and 11 in a pretermined position relative to one another. The main purpose of the ring 18 is to maintain the position of the ends 12 and 14 of the pipes 10 and 11 in longitudinal spaced relation as well as centering the end 12 of the pipe 10 within the cored out portion 15 of the end 14 of the pipe 11.

Three sealing rings 20, 21 and 22 are inserted into the space 17 of the joint. The rings 20, 21 and 22 have oppositely disposed sloping side walls 23 and 24 bearing against each other. The side walls 23 formed on the rings 20 and 22 diverge outwardly, while the sloping surfaces on the ring 22 converge to fit closely within the diverging side walls of the rings 20 and 22. The rings 20, 21 and 22 fit into the space 17 of the joint with a slight inner and outer peripheral clearance as shown at 25 and 26 in Figure 3, which is exaggerated for purposes of illustration, while no pressure exists within the pipe line. The rings 20, 21 and 22 are each slightly split, as at 27, permitting them to expand peripherally to compensate for lateral compression as required, the splits being radially spaced on the separate rings and adapted to be substantially self closing upon the introduction of gas under pressure acting to compact the sealing rings against the end of annular ring 18.

A space 28 exists between the end 12 of the pipe 10 and the shoulder 16 of the pipe 11. This space 28 permits gas pressure to enter behind the sealing rings 20, 21 and 22 against the face 29 of the ring 22. This pressure causes the sloping surfaces 23 to expand the rings 20, 21 and 22, closing the clearances 25 and 26 within the space 17, as well as the splits 27, providing a gas seal therein and between the ends 12 and 14 of the pipes 10 and 11, as illustrated particularly in Figure 4.

It has been found that a spring washer 30 will assist in maintaining this seal S, although its use is not essential.

With the seal S, the pipes 10 and 11 can vibrate or move, expand or contract, without wearing or distorting the seal S between the pipes 10 and 11.

In operation, the gas pressure entered between the end 12 of the pipe 10 and the shoulder 16 of the pipe 11 compresses the sealing rings 20, 21 and 22 together, forming a seal S within the space 17 of the joint. The greater the pressure applied from within the pipes 10 and 11 against the ring 22, the tighter the seal S will become, adjusting itself to the diameters of the ends 12 and 14 of the pipes 10 and 11 under all conditions existing due to heat expansion, and also conditions caused by movement of the joint within itself due to vibration.

This new and improved seal S for pipe joints is especially effective for exhaust pipe lines on engines and the like, or pipe lines carrying gas or high pressure fluid.

Having thus described the preferred embodiment of the invention, it should be understood that numerous structural modifications and adaptations may be resorted to without departing from the scope of the appended claims.

What is claimed is:

1. A sealing for pipe joints of the type having telescopically related inner and outer pipe ends with said inner pipe end having an outer annular recess terminating in a transverse annular outer shoulder said outer annular recess having a continuous smooth outer cylindrical surface and said outer pipe end having an internal annular recess terminating in a transverse annular inner shoulder, said internal annular recess having a continuous smooth inner cylindrical surface, said annular inner shoulder being spaced from the inner pipe end to provide an annular gas passage an annular ring engaged in the outer recess of said inner pipe end in contacting relation with the shoulder on said inner pipe end and the smooth outer cylindrical surface on said outer recess, an upstanding integral flange radially extending outwardly from said annular ring arranged in spacing engagement with the terminal end of said outer pipe end, said terminal end of said inner pipe end being disposed in spaced parallel relation to said inner shoulder, said smooth inner cylindrical surface of said internal recess in said outer pipe end engaging the outer surface of said annular ring, a split sealing ring positioned between said inner and outer pipe ends having a flat side wall in engagement with said annular ring and having a sloping side wall formed thereon opposite said annular ring, a second split sealing ring arranged in spaced parallel relation to said first split sealing ring and having a wall formed thereon on the side thereof adjacent the sloping wall on said first named sealing ring and sloping oppositely thereto, the opposite side wall of said second ring being flat and spaced from said annular inner shoulder to provide a gas pressure chamber comprising a continuation of said annular gas passage and a third split sealing ring positioned between said first and second named sealing rings, said third sealing ring having outwardly converging side walls engaging respectively the sloping walls of said first and second named sealing rings whereby gas pressure in the pipes impinging on said flat side wall of said second split sealing ring opposite the sloping side wall thereof will impart longitudinal movement to said second named sealing ring forcing by wedge action said sealing rings into sealing contact with said inner and outer smooth cylindrical surfaces of said recesses in said pipe ends.

2. A device as claimed in claim 1 which includes a corrugated annular spring strip positioned in said joint extending into said gas pressure chamber and said annular gas passage engaging on one side said inner shoulder and on the opposite side the adjacent flat side of said second split sealing ring resiliently pressing said sealing rings into contact in the absence of gas pressure within the pipe joint.

References Cited in the file of this patent

UNITED STATES PATENTS

| | | |
|---|---|---|
| 233,412 | Harvey | Oct. 19, 1880 |
| 546,258 | Suverkrop | Sept. 10, 1895 |
| 569,247 | Smith | Oct. 13, 1896 |
| 825,480 | Paterson et al. | July 10, 1906 |
| 1,573,862 | Raber | Feb. 23, 1926 |
| 1,612,973 | Gold | Jan. 4, 1927 |
| 1,694,822 | Kennedy | Dec. 11, 1928 |
| 1,928,076 | Rudolph | Sept. 26, 1933 |
| 1,998,632 | McLaughlin | Apr. 23, 1935 |
| 2,017,994 | Spang | Oct. 22, 1935 |
| 2,786,697 | Rescheneder | Mar. 26, 1957 |

FOREIGN PATENTS

| | | |
|---|---|---|
| 1,382 | Great Britain | Jan. 22, 1894 |
| 164,593 | Great Britain | June 16, 1921 |
| 357,335 | Great Britain | Sept. 24, 1931 |
| 616,577 | France | Oct. 30, 1926 |
| 707,345 | Germany | June 19, 1941 |